(12) United States Patent
List et al.

(10) Patent No.: US 8,808,129 B2
(45) Date of Patent: Aug. 19, 2014

(54) TRANSMISSION DEVICE WITH A HYDRAULIC SYSTEM COMPRISING A TRANSMISSION MAIN PUMP APPARATUS

(75) Inventors: Matthias List, Friedrichshafen (DE); Thilo Schmidt, Meckenbeuren (DE); Thomas Lindner, Kressbronn (DE); Peter Tiesler, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1058 days.

(21) Appl. No.: 12/606,639

(22) Filed: Oct. 27, 2009

(65) Prior Publication Data
US 2010/0125023 A1    May 20, 2010

(30) Foreign Application Priority Data
Nov. 14, 2008  (DE) .......................... 10 2008 043 734

(51) Int. Cl.
*F16H 57/04*  (2010.01)
*F16H 61/00*  (2006.01)

(52) U.S. Cl.
CPC .................................. *F16H 61/0031* (2013.01)
USPC ........................................ 475/159; 475/160

(58) Field of Classification Search
USPC ............................................... 475/159–160
See application file for complete search history.

(56) References Cited

U.S. PATENT DOCUMENTS

| 5,931,758 | A | 8/1999 | Walter |
| 6,039,666 | A | 3/2000 | Okuda et al. |
| 6,440,026 | B1 | 8/2002 | Johnson et al. |
| 7,448,976 | B2 | 11/2008 | Hiraki et al. |
| 2003/0207733 | A1 * | 11/2003 | Ishimaru et al. ................ 475/83 |
| 2005/0029068 | A1 * | 2/2005 | Koenig et al. ............. 192/48.91 |
| 2005/0082135 | A1 * | 4/2005 | Arai et al. ..................... 180/249 |
| 2008/0108467 | A1 * | 5/2008 | Hiraki et al. ...................... 475/5 |

FOREIGN PATENT DOCUMENTS

| DE | 198 01 766 A1 | 7/1998 |
| DE | 689 29 357 T2 | 7/2002 |
| DE | 699 09 031 T2 | 4/2004 |
| DE | 103 18 152 A1 | 11/2004 |
| DE | 601 07 592 T2 | 5/2005 |
| DE | 11 2004 000 874 B4 | 4/2008 |

* cited by examiner

*Primary Examiner* — Derek D Knight
(74) *Attorney, Agent, or Firm* — Davis & Bujold, PLLC; Michael J. Bujold

(57) ABSTRACT

A transmission device (1) with a hydraulic system (4) comprising a main transmission pump device for supplying various transmission components with hydraulic fluid. The main transmission pump device is driven by torque applied to the transmission input shaft (2). A force flow between the transmission input shaft (2) and transmission output shaft (3) is produced by various hydraulically actuated transmission components. When the hydraulic system (4) is not supplied by the main transmission pump, the force flow is interrupted. The hydraulic system (4) has an auxiliary pump device (5) by virtue of which the hydraulic system (4) too can be supplied with hydraulic fluid. The auxiliary pump device (5) is driven by torque applied to the transmission output shaft (3) at least when the force flow is interrupted.

20 Claims, 2 Drawing Sheets

TRANSMISSION DEVICE WITH A HYDRAULIC SYSTEM COMPRISING A TRANSMISSION MAIN PUMP APPARATUS

This application claims priority from German patent application serial no. 10 2008 043 734.4 filed Nov. 14, 2008.

FIELD OF THE INVENTION

The invention concerns a transmission device with a hydraulic system comprising a main transmission pump device.

BACKGROUND OF THE INVENTION

Transmission devices known from practice, in particular automatic transmissions, are made with a hydraulic system comprising a main transmission pump for the supply of hydraulic fluid to various transmission components. Such main transmission pumps are often arranged on the transmission input side and can be driven by a torque applied to a transmission input shaft, for example by torque from a drive machine of a vehicle drivetrain. A force flow can be produced between the transmission input shaft and a transmission output shaft by various respective hydraulically actuated transmission components, this force flow being interrupted when the hydraulic system is not supplied by the main transmission pump device.

Vehicles made with transmission devices whose main transmission pumps can be driven by the engine are fundamentally characterized, as a consequence of the system, by reduced ability to be towed. Without special measures both the towing speeds and the towing distances are usually very limited, but this is undesirable.

The limited towing ability is the result of insufficient supply of the transmission components with hydraulic fluid by the main transmission pump when the drive machine is switched off, since during a towing process, while the drive wheels are in contact with the ground, a torque is transferred into the transmission device via a transmission output shaft and transmission components actively connected to the transmission output shaft are driven in rotation. Owing to the deficient lubrication and cooling of these driven transmission components, the frictional heat generated in the area of the transmission components during a towing process can only be dissipated to a limited extent, so that the thermal loading of the transmission components becomes undesirably high and sometimes seizing that permanently compromises the operation of the transmission device can take place.

The problems that result from inadequate supply of hydraulic fluid to a transmission device can sometimes also occur during other operating condition variations of a vehicle, depending on the design of the vehicle's drivetrain. For example, a transmission device as described earlier in a hybrid all-wheel-drive vehicle may likewise not be supplied to the desired extent with hydraulic fluid from a main transmission pump device arranged on the transmission input side, during purely electric driving operation by an electric machine which is directly associated with a vehicle axle without having to pass the drive torque of the electric machine via the transmission device.

Besides the main or primary pumps provided for supplying oil to an automatic transmission and driven by the engine, to avoid the above-mentioned problems additional, so-termed secondary or auxiliary pump devices are provided in transmissions, which supply a hydraulic system with hydraulic fluid in place of, or in addition to the main transmission pump, carry out other oil supply functions, and have separate driving means.

Disadvantageously, compared with transmission devices made without an auxiliary pump device, the last-mentioned design of transmission devices with a respective main transmission pump that can be driven by a drive engine and an auxiliary pump preferably driven by an electric motor increases the production costs of a transmission device.

Furthermore, in unfavorable operating situations the current uptake of an active auxiliary pump device places an undesirably high load on the vehicle's electric system. In addition, the arrangement of the auxiliary pump preferably on the outside of the housing of the transmission device takes up structural space in the vehicle and entails construction costs and effort for the hydraulic connection of the auxiliary pump to a hydraulic system of the transmission device and for the electrical connection of the auxiliary pump to the electric control and regulating system of a drivetrain of a vehicle, to an undesired extent.

Alternatively to the auxiliary pump device it is also possible to make vehicle drivetrains in which an active connection between the transmission and the drive output can be interrupted when necessary by an operator, in order to avoid operating conditions of transmission devices during which high loads occur without corresponding lubrication and cooling. The active connection between the transmission and the drive output can be broken for example by disconnecting the cardan shaft or by some other suitable measure, but vehicle drivetrains made in this way are again characterized by high production costs and are of complex design.

SUMMARY OF THE INVENTION

Accordingly, the purpose of the present invention is to provide a transmission device in which, to avoid operating situations that have an adverse effect on the friction of the transmission, transmission components can be supplied to the desired extent with hydraulic fluid even during towing processes or during operating condition variations comparable thereto, inexpensively and with little structural space occupation.

The transmission device according to the invention is made with a hydraulic system comprising a main transmission pump device for supplying various transmission components with hydraulic fluid. The main transmission pump can be driven by a torque applied to a transmission input shaft. A force flow between the transmission input shaft and a transmission output shaft can be produced via various hydraulically actuated transmission components and interrupted when the hydraulic system is not supplied by the main transmission pump. In addition, the hydraulic system is made with an auxiliary pump device by virtue of which the hydraulic system too can be supplied with hydraulic fluid.

Since the auxiliary pump device can be driven by a torque applied to the transmission output shaft, at least when the force flow in the transmission device is interrupted, the hydraulic system can be supplied with hydraulic fluid from the auxiliary pump even if the main transmission pump device is not delivering any.

Thus, in the area of the transmission device operating conditions that compromise the function of the transmission device, for example during a towing process of a vehicle built with the transmission device or during electric driving operation of a hybrid all-wheel-drive vehicle with the transmission device, can be avoided thanks to the sufficient lubrication and cooling made available by the auxiliary pump. Furthermore, the transmission device can be supplied with hydraulic fluid by the auxiliary pump inexpensively and with little need for structural space, since the auxiliary pump is designed to be driven by the transmission output shaft so that no additional or separate drive, such as an electric motor, is needed for operating the auxiliary pump.

In an advantageous further development of the transmission device according to the invention, the auxiliary pump device is connected to the transmission output shaft or to the transmission input shaft and can be brought into active engagement, respectively with the transmission input shaft or the transmission output shaft, by means of a coupling device. In a simple manner this makes it possible to supply the hydraulic system with hydraulic fluid from the auxiliary pump only in predefined operating conditions, and otherwise to break the driving connection with the transmission input or output shaft in the area of the coupling device. This means that other than in the predefined cases of need during which the auxiliary pump is switched on, no power losses occur in the area of the auxiliary pump device and the transmission device can be operated with high efficiency.

Alternatively, the auxiliary pump device is fixed on the transmission housing or connected to the transmission housing and, in the event that the lubrication and/or cooling provided by the main transmission pump is insufficient, can be brought into active engagement with the transmission output shaft inexpensively and with little structural space occupation, in order to supply the transmission components with hydraulic fluid as necessary depending on the operating situation.

In a space-saving further development of the transmission device according to the invention, the coupling device is designed to be hydraulically actuated, so that the active connection between the auxiliary pump and the transmission output or input shaft can be made inexpensively as a function of an actuation pressure, preferably an actuation pressure of one of the hydraulically actuated transmission components of the transmission device, since for example there is no need for additional pressure regulators or suchlike.

An embodiment of the transmission device according to the invention characterized by less sealing complexity compared with the last-mentioned embodiment of the transmission device, is formed with a mechanically actuated coupling device, so that the active connection between the auxiliary pump and the transmission output or input shaft can preferably be made by an emergency release device of a parking lock of the transmission device, which in a manner known per se, usually has to be actuated, before a towing process of a vehicle made, with a transmission device preferably in the form of an automatic transmission.

In a particularly space-saving transmission device according to the invention, the auxiliary pump device is accommodated inside the transmission output shaft, so that compared with transmissions made without an auxiliary pump device no additional structural space at all is needed for the said auxiliary pump.

Alternatively, in an advantageous embodiment of the transmission device according to the invention, the auxiliary pump is arranged outside the transmission output shaft and in other embodiments of the transmission device the auxiliary pump can be driven by an eccentric connected to the transmission output shaft, or the coupling device is made as a chain drive, belt drive or gear stage.

In an advantageous embodiment of the transmission device according to the invention, the auxiliary pump device, preferably made as an axial piston pump, comprises at least one piston element arranged to move longitudinally in a pump housing component and spring-loaded in the expansion direction, which together with the pump housing component delimits a piston space that can be connected, via a first valve device, to a suction zone and, via a second valve device, to a compression zone of the auxiliary pump device, so that the auxiliary pump device can be arranged inside the transmission output shaft or even outside the transmission output shaft, preferably with little production effort.

In a further development of the transmission device according to the invention, the piston element is connected in an area facing away from the piston space to a first cam element of the coupling device, which is connected rotationally fixed but longitudinally movably to the transmission output shaft and which can be brought into active connection with a second cam element which is permanently fixed to the transmission input shaft, such that if there is a speed difference between the two cam elements and if the active connection between the cam elements is in place, the piston element moves back and forth in the pump housing component and, depending on the torque applied to the transmission output shaft, supplies the hydraulic system with hydraulic fluid.

In a simple manner this makes it possible, inexpensively and with a saving of space, to supply the transmission components of the transmission device with hydraulic fluid from the auxiliary pump device during a towing process during which the transmission input shaft is static in the transmission housing with the drive machine of a vehicle's drivetrain switched off and, since the mean transmission pump device is then not delivering, the force flow in the transmission device is interrupted, as when the active connection is in place between the transmission output shaft, which rotates along with the drive output of the vehicle's drive because of the active connection, and the auxiliary pump device, the latter is driven without recourse to a secondary drive characterized by high production costs and a substantial need for structural space, for example an electric motor.

In a further advantageous embodiment of the transmission device according to the invention, the second cam element is connected to the transmission input shaft by at least two cam pins, these cam pins being made differently in order to ensure a defined assembly position of the second cam element which is required for the operation of the auxiliary pump device.

A simply designed embodiment of the transmission device according to the invention is characterized in that the compression zone of the auxiliary pump device is connected to a lubrication pressure duct of the transmission input shaft via a through-bore of a cam pin of the second cam element.

In an also simply designed and inexpensive further development of the transmission device according to the invention, the active connection between the two cam elements can be released by means of an actuating pressure of a shift element in opposition to the spring force that acts on the piston element of the auxiliary pump device.

BRIEF DESCRIPTION OF THE DRAWINGS

Other advantages and advantageous further developments of the invention emerge from the claims and from the example embodiment whose principle is described with reference to the drawings.

They show.

DETAILED DESCRIPTION OF THE PREFERRED EMBODIMENTS

Figure 1:
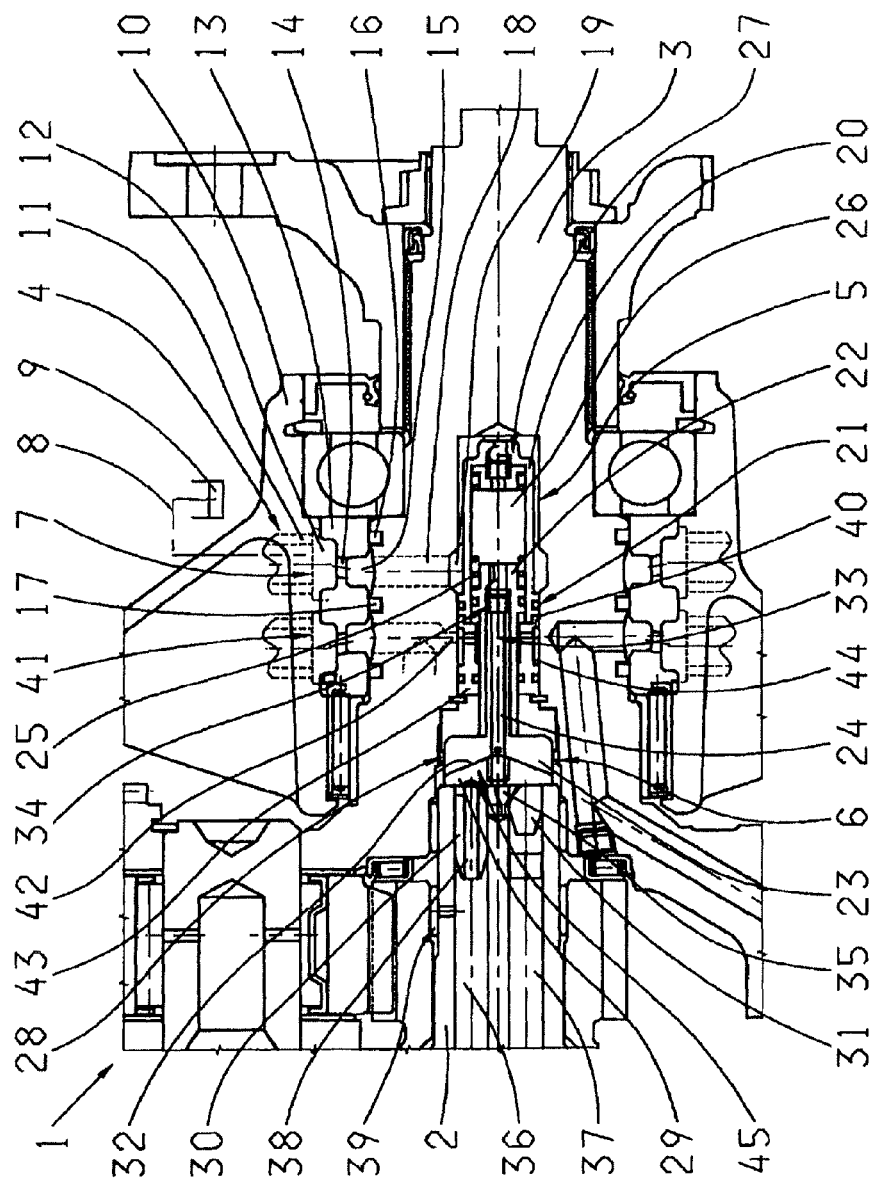
FIG. 1 is a schematic partial sectioned view of a transmission device according to the invention.

FIG. 1 represents a greatly simplified, partial longitudinally sectioned view of a transmission device 1 with a transmission input shaft 2, a main transmission shaft and a transmission output shaft 3. The transmission device 1 is made with a hydraulic system 4 by which various transmission components can be supplied with hydraulic fluid. The hydraulic system 4 is made with a main transmission pump device MTPD, shown in FIG. 2, arranged on the transmission input side, which can be driven by a torque applied to the transmission input shaft 2 in a manner known per se.

A force flow between the transmission input shaft 2 and the transmission output shaft 3 can be produced by means of various hydraulically actuated transmission components, i.e. in the present case by frictional shift elements such as disk clutches and disk brakes. In the transmission device 1 the force flow is interrupted when the hydraulic system 4 is not supplied by the main transmission device, this operating situation of the transmission device 1 existing essentially when a drive device of a vehicle drivetrain made with the transmission device 1, which is in or can be brought into active connection with the transmission input shaft 2, is switched off.

In such an operating condition of a vehicle's drivetrain or its transmission device 1, in order still to be able to supply the hydraulic system 4 or the various transmission components of the transmission device to the necessary extent, the hydraulic system 4 is provided with an auxiliary pump device 5 by means of which the hydraulic system 4 can also be supplied with hydraulic fluid since, when the force flow in the transmission device 1 is interrupted, the auxiliary pump 5 can be driven by a torque applied to the transmission output shaft 3.

The transmission output shaft 3 is connected to a drive output of the vehicle drivetrain made with the transmission device, so that, for example during a towing process of the vehicle in which the drive output or the wheels of the vehicle's drive output are rolling on the road surface, the output torque present at the drive output is applied to the transmission output shaft 3 and transmitted to transmission components actively connected to the transmission output shaft 3, while when the force flow in the transmission device 1 is interrupted, transmission components not connected to the transmission output shaft 3 are essentially static. This means that during a towing process of a vehicle, in the area of the main transmission pump device no hydraulic fluid is being delivered, and the main transmission pump device supplies neither an actuation pressure for the hydraulically actuated transmission components nor a volume flow of lubrication and cooling oil.

In such a case the auxiliary pump device 5 can be brought into active connection with the transmission input shaft 2 by a hydraulically actuated coupling device 6, in the area of which the torque applied to the transmission output shaft 3 can be transferred by the coupling device 6 in order to actuate the auxiliary pump device 5.

In the example embodiment illustrated in FIG. 1 the auxiliary pump device 5 is arranged inside the transmission output shaft 3 and is made in the form of an axial piston pump by means of which hydraulic fluid can be supplied when the main transmission pump device is not delivering any. A suction zone 7 of the auxiliary pump device 5 is connected, via a hydraulic line 8, to an oil sump 9 of the transmission device 1, so that when the auxiliary pump device 5 is operating it can draw in hydraulic fluid from there. The suction zone 7 of the auxiliary pump device 5 comprises a steel tube 11 cast in place into a transmission housing 10 made of aluminum, which is prefabricated before being cast into place with the desired shape characterized by bends and suchlike. This procedure is adopted because the shape of the oil-carrying connection between the oil sump and the suction zone 7 cannot be produced by subsequently drilling bores in the transmission housing 10.

It is also possible to make the auxiliary pump as an impeller cell pump or as some other suitable positive-displacement pump, for example a diaphragm pump, or even a flow pump.

The steel tube 11 opens into an annular space 12 delimited by an annular element 13. In this case the annular element 13 is made of steel and has bores 14 distributed around its circumference, which form a connection between the annular space 12 and another annular space 15 located radially farther inside relative to the transmission output shaft 3. Moreover, the annular element 13 is connected rotationally fixed to the transmission housing 10, so that when the transmission device 1 is operating there is a speed difference between the transmission output shaft 3 and the annular element 13. For sealing purposes, two square-section rings 16, 17 are provided between the transmission output shaft 3 and the annular element 13.

Starting from the other annular space 15 of the suction zone 7 of the auxiliary pump device 5, the hydraulic fluid drawn in is passed, via a bore 18 provided in the transmission output shaft 3 into an additional annular space 19, which is delimited by the transmission output shaft 3 and a pump housing component or pump cylinder 20.

During operation of the transmission device 1, the pump cylinder 20 of the auxiliary pump device 5 has no speed difference relative to the transmission output shaft 3, since by virtue of the friction force of a sealing element 21, in this case in the form of an O-ring that forms a seal between the pump cylinder 20 and the transmission output shaft 3, the pump cylinder 20 is held static within the transmission output shaft 3 or has the same speed as the latter.

In the pump cylinder 20 is arranged a longitudinally movable piston element 22 of the auxiliary pump device 5, which is connected rotationally fixed to a first cam element of the coupling device 6. The rotationally fixed connection between the piston element 22 and the first cam element 23 is in this case made by adhesive bonding, but this rotationally fixed connection can also be made by a press-fit or by some other suitable connection means, depending on the application concerned.

The first cam element 23 engages over a long axial path with the piston element 22, in this case made as a hollow cylinder, and is made with a through-bore 24 that runs in the axial direction of the first cam element 23. In the area of its end facing away from the first cam element 23, the piston element 22 is spring-loaded by spring device 25 in the suction direction of the auxiliary pump device 5, i.e. in a movement direction of the piston element 22 that enlarges a piston space 26 of the auxiliary pump device 5.

Between the suction zone 7 of the auxiliary pump device 5 and the piston space 26 a first valve device 27 is provided, which prevents any back-flow of hydraulic fluid present in the piston space 26 during a compression movement of the piston element 22 in the direction of the suction zone 7. In the present case the first valve device 27 is a non-return valve which can be in the form of a ball valve, a plate valve, a diaphragm valve or the like, and can also be made as a switchable valve device in other example embodiments of the transmission device according to the invention not illustrated in the drawing.

The first cam element 23 is connected in a rotationally fixed manner to the transmission output shaft 3 by a connecting device 28 and is fitted so that it can move longitudinally in the axial direction of the transmission output shaft 3. In this case the connecting device 28 is in the form of a splined shaft profile, but in other example embodiments of the transmission device according to the invention it could also be designed in other ways.

Owing to the rotationally fixed connection between the first cam element 23 and the transmission output shaft 3, in all operating ranges of the transmission device 1 the first cam element 23 rotates at the same speed as the transmission output shaft 3. In the operating condition of the auxiliary pump device 5 shown in FIG. 1, the first cam element 23 co-operates in the area of its end facing away from the piston element 22 with a second cam element 29, which is connected in a rotationally fixed manner on the transmission input shaft 2 by three cam pins, of which only the two cam pins 30, 31 are visible in the section plane of FIG. 1.

The second cam element 29, formed cylindrically at least in some sections, is at its end facing toward the first cam element 23 shaped at least approximately like a roof. At the same time the first cam element 23, which is also cylindrical in some areas, has in its end area that co-operates with the second cam element 29 a recess 45 which corresponds with the roof-shaped end of the latter in such manner that when there is a rotation speed difference between the two cam elements 23 and 29, the roof-shaped end of the second cam element 29 alternately engages in the recess of the first cam element 23 and then slips out of it again. When there is a speed difference between the cam elements 23 and 29 this design of the two of them results in alternating and successive axial movements of the first cam element 23 and also, therefore, of the piston element 22 of the auxiliary pump device 5 connected thereto, against the spring force of the spring device 25 away from the transmission input shaft 2 and due to the compression of the spring back toward the transmission input shaft 2, such that the piston element 22 undergoes the pumping movement required for the auxiliary pump device 5 to perform its delivering function.

During a towing process, or some other operating condition of a vehicle during which, for example, the vehicle is operated purely electrically by an electric machine directly associated with a vehicle axle, the torque of this machine being applied directly to the wheels of the associated vehicle axle so that no torque is passing through the rest of the vehicle's drivetrain containing the transmission device 1, the main transmission pump device driven by the transmission input does not deliver any hydraulic fluid since the main transmission input shaft 2 is essentially static. The drive output torque produced by the electric machine or by the towing process is applied on the transmission output side or to the transmission output shaft 3, so that there is a speed difference between the first cam element 23 and the second cam element 29, and this is converted by virtue of the two mutually actively connected end areas of the respective cam elements 23 and 29 into an axial actuation movement of the first cam element 23 and of the piston element 22 in fixed connection with it.

This axial movement of the piston element 22 brings about a delivery of hydraulic fluid from the suction zone 7 of the auxiliary pump device 5 toward a compression zone 33 of the pump 5. Relative to the piston space 26 the compression zone 33 of the auxiliary pump device 5 extends downstream from a second valve device 34, which is arranged between the piston space 26 of the auxiliary pump device 5 and the through-bore 24 of the first cam element 23, as far as a channel 35 of the transmission input shaft 2 in this case designed as a centering element. In the present case the channel 35 is formed during the production of the transmission input shaft 2 in the end face thereof that faces toward the transmission output shaft 3. By means of the valve device 34, back-flow of hydraulic fluid from the compression zone 33 toward the piston space 26 of the auxiliary pump device 5 is prevented.

Furthermore, a number of deep-hole bores 36 and 37, which carry hydraulic fluid during operation of the main transmission pump device, are provided in the transmission input shaft 2, as well as another deep-hole bore not visible in the sectioned view of the drawing, in which the cam pins 30, 31 of the of the second cam element 29 engage with no clearance. In this case the cam pins 30, 31 are made with different lengths and the deep-hole bores with depths that correspond to these in such manner that the second cam element 29 can only be fitted in one predefined orientation relative to the main transmission shaft 2.

The channel 35 or recess in the transmission input shaft 2 is, in the present case, made with a diameter such that the opening areas of the deep-hole bores, 36, 37 are overlapped by the opening area of the channel 35 in the manner shown in more detail in FIG. 1, so that the channel 35 is connected to a further bore 38 made in the second cam element 29 or its cam pin 30, which opens into the deep-hole bore 36. Thus, the deep-hole bore 36 constitutes the lubrication pressure duct of the transmission device 1, which is also connected to the main transmission pump device 1 of the transmission. So by virtue of the lubrication pressure duct 36, starting from the auxiliary pump device 5, bearing points 39 of the transmission 1 can be supplied with hydraulic fluid to the extent desired for lubrication and cooling.

To be able to deactivate the auxiliary pump device 5 during normal operation of the transmission device 1, i.e. when the main transmission pump device is delivering, in a control surface area 40 facing away from the piston space 26 the piston element 22 is connected to a pressurized zone 41 of the transmission device 1. When the pressure in the pressurized zone 41 is sufficiently large, the piston element 22 together with the first cam element 23 can be moved in the axial extension of the transmission output shaft 3 in the direction toward the first valve device 27 against the spring force of the spring device 25, and thus out of engagement with the second cam element 29, so that even if there is a speed difference between the transmission input shaft 2 and the transmission output shaft 3 no axial movement of the piston element 22 takes place and the auxiliary pump device 5 has been deactivated.

In the present case the pressurized zone 41 of the transmission device 1 is provided for the control of a shift element of the transmission device made as a friction clutch, and in a simple manner extends, via an additional bore 42 in the transmission output shaft 3 and an annular space 44 delimited by a second pump housing portion 43 of the auxiliary pump device 5, toward the control surface area 40 of the piston element 22.

In the example embodiment of the transmission device 1 according to the invention described above and illustrated in the drawing, the auxiliary pump device 5 is space-savingly integrated within the transmission output shaft 3 of the transmission device 1 and is activated when there is a speed difference between the transmission output shaft 3 and the transmission input shaft 2, so that when the auxiliary pump device 5 is being driven, transmission components of the transmission device 1 can be acted upon with hydraulic fluid at least for lubrication and cooling, when the main transmission pump device is supplying no hydraulic fluid volume.

In addition, during the above-described, pressure-dependent deactivation of the auxiliary pump device 5 by the clutch pressure of a hydraulically actuated shift element of the transmission device 1, in a simple manner it is possible to use the return movement of the piston element 22 of the auxiliary pump device to damp the engagement jerk in the area of the associated shift element, so that there is no need for a spring plate to be provided for that purpose in the area of the shift element or clutch.

In a further advantageous embodiment of the transmission device according to the invention, the auxiliary pump device, or its delivery power, are designed such that above a predefined speed limit the auxiliary pump no longer pumps, and the working range of the auxiliary pump can for example be set at between 1000 r/min and 2700 r/min.

Deviating from the central arrangement of the auxiliary pump device in the transmission output shaft shown in the drawing, depending on the application it is also possible to arrange the auxiliary pump device eccentrically in the transmission output shaft, and with an eccentric arrangement of the auxiliary pump device the piston element of the auxiliary pump device can be fitted with a roller of the coupling device, so that the second cam element is no longer needed.

Figure 2:
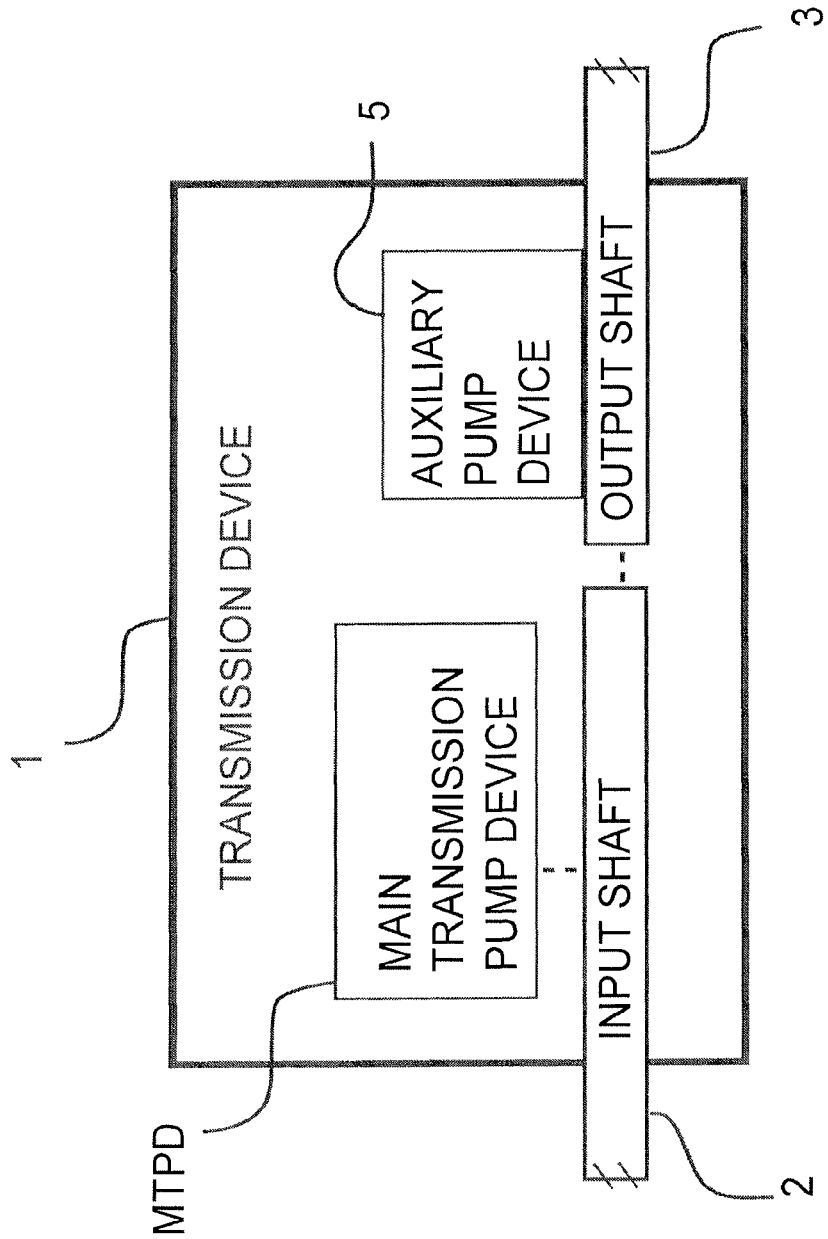
FIG. 2 is a schematic representation of a transmission device according to the invention.

Alternatively to the axial and integrated arrangement of the auxiliary pump device in the transmission output shaft, in further example embodiments of the transmission device according to the invention the auxiliary pump device can also be arranged outside the transmission output shaft, as shown in FIG. 2, and radially or axially parallel thereto, and can be driven by an eccentric of the coupling device of the transmission output shaft. Thus, for example with an axis-parallel arrangement between the auxiliary pump device and the transmission output shaft it would be possible to provide in the area of the coupling device an axial curved track on the transmission output shaft in the form of a swash-plate, also arranged axially for driving the auxiliary pump device.

As another alternative, in the case of an auxiliary pump device arranged outside the transmission output shaft the coupling device for driving the auxiliary pump by means of the transmission output shaft can be made with a chain or belt drive or with a gearwheel stage.

INDEXES

1 Transmission device
2 Transmission input shaft, main transmission shaft
3 Transmission output shaft
4 Hydraulic system
5 Auxiliary pump device
6 Coupling device
7 Suction zone of the auxiliary pump device
8 Hydraulic line
9 Oil sump
10 Transmission housing
11 Steel tube
12 Annular space
13 Annular element
14 Bore
15 Further annular space
16, 17 Rectangular-section rings
18 Bore
19 Additional annular space
20 Pump housing component, pump cylinder
21 Sealing device
22 Piston element
23 First cam element
24 Through-bore
25 Spring device
26 Piston space
27 First valve device
28 Connecting device
29 Second cam element
30, 31 Cam pins
32 End face of the second cam element
33 Compression zone of the auxiliary pump device
34 Second valve device
35 Channel
36 Deep-hole bore, lubrication duct
37 Deep-hole bore
38 Further bore
39 Bearing point
40 Control surface area
41 Pressurized zone
42 Additional bore
43 Second pump housing portion
44 Annular space
45 Recess

The invention claimed is:

1. An automatic transmission (1) with a hydraulic system (4) comprising:
a main transmission pump device for supplying various transmission components with hydraulic fluid, which are driven by torque applied to an automatic transmission input shaft (2) such that a force flow, between the automatic transmission input shaft (2) and an automatic transmission output shaft (3), is produced by various hydraulically actuated transmission components which facilitate coupling of the automatic transmission input shaft (2) to the automatic transmission output shaft (3) for transferring the force flow through the automatic transmission, and, when the force flow supplied by the automatic transmission input shaft (2) is interrupted, the main transmission pump device is prevented from supplying hydraulic fluid to the hydraulic system (4),
the hydraulic system (4) being formed with an auxiliary pump device (5) by which the hydraulic system (4) can also be supplied with hydraulic fluid, and
the auxiliary pump device (5) being exclusively driven by a torque flowing from the automatic transmission output shaft (3) when a coupling device (6) is engaged.

2. The automatic transmission device according to claim 1, wherein the auxiliary pump device (5) is connected to one of either the automatic transmission output shaft (3) and the automatic transmission input shaft (2) and is actively connected, respectively, with either the transmission input shaft (2) or the transmission output shaft (3) by the coupling device (6).

3. The automatic transmission device according to claim 2, wherein the coupling device (6) is actuated hydraulically and the active connection between the auxiliary pump device (5) and the one of either the automatic transmission input shaft (2) and the automatic transmission output shaft (3) is a function of an actuation pressure.

4. The automatic transmission device according to claim 2, wherein the coupling device (6) is actuated mechanically, and the active connection between the auxiliary pump device and the one of either the automatic transmission input shaft (2) and the automatic transmission output shaft (3), formed by the coupling device (6), is influenced by an emergency release device of a parking lock device.

5. The automatic transmission device according to claim 2, wherein the coupling device (6) comprises an eccentric connected to the automatic transmission output shaft (3) by which the auxiliary pump device (5) is driven.

6. The automatic transmission device according to claim 1, wherein the auxiliary pump device (5) is connected to a transmission housing and is actively connectable with the automatic transmission output shaft (3) by a coupling device (6).

7. The automatic transmission device according to claim 1, wherein the auxiliary pump device (5) is arranged outside one of either the automatic transmission input shaft (2) and the automatic transmission output shaft (3).

8. The automatic transmission device according to claim 1, wherein a coupling device (6) is one of a chain drive, a belt drive, and a gear stage.

9. The automatic transmission device according to claim 1, wherein the auxiliary pump device (5) comprises an axial piston pump.

10. A transmission device (1) with a hydraulic system (4) comprising:
   various transmission components that are driven by torque applied to a transmission input shaft (2) such that a force flow, between the transmission input shaft (2) and a transmission output shaft (3), is produced by various hydraulically actuated transmission components;
   the hydraulic system (4) being formed with an auxiliary pump device (5) by which the hydraulic system (4) is also supplied with hydraulic fluid;
   the auxiliary pump device (5) being drivable by a torque applied to the transmission output shaft (3) at least when the force flow is interrupted; and
   the auxiliary pump device (5) being arranged inside one of either the transmission input shaft (2) and the transmission output shaft (3).

11. The transmission device according to claim 10, wherein the auxiliary pump device (5) is connected to one of either the transmission output shaft (3) and the transmission input shaft (2) and is actively connected by a coupling device (6) with either the transmission input shaft (2) or the transmission output shaft (3).

12. The transmission device according to claim 10, wherein the auxiliary pump device (5) is connected to a transmission housing and is actively connectable with the transmission output shaft (3) by a coupling device (6).

13. The transmission device according to claim 10, wherein a coupling device (6) is actuated hydraulically and the active connection between the auxiliary pump device (5) and the one of either the transmission input shaft (2) and the transmission output shaft (3) is a function of an actuation pressure.

14. The transmission device according to claim 10, wherein a coupling device (6) is actuated mechanically, and the active connection between the auxiliary pump device and the one of either the transmission input shaft (2) and the transmission output shaft (3), formed by the coupling device (6), is influenced by an emergency release device of a parking lock device.

15. The transmission device according to claim 10, wherein the auxiliary pump device (5) comprises an axial piston pump, the auxiliary pump device (5) is driven by the transmission output shaft (3), a main transmission pump device is driven by the transmission input shaft (2), and the auxiliary pump device (5) and the main transmission pump device operate independent of one another.

16. A transmission device (1) with a hydraulic system (4) comprising:
   various transmission components that are driven by torque applied to a transmission input shaft (2) such that a force flow, between the transmission input shaft (2) and a transmission output shaft (3), is produced by various hydraulically actuated transmission components;
   the hydraulic system (4) being formed with an auxiliary pump device (5) by which the hydraulic system (4) is also supplied with hydraulic fluid;
   the auxiliary pump device (5) being drivable by a torque applied to the transmission output shaft (3) at least when the force flow is interrupted; and
   the auxiliary pump device (5) comprising at least one piston element (22) arranged to move longitudinally in a pump housing component (20) and spring-loaded in an expansion direction which, together with the pump housing component (20), delimits a piston space (26) that is connected, via a first valve device (27), to a suction zone (7) and, via a second valve device (34), to a compression zone (33) of the auxiliary pump device (5).

17. The transmission device according to claim 16, wherein the piston element (22) is connected to a first cam element (23) of a coupling device (6), in an area facing away from the piston space (26), which is connected in a rotationally fixed and longitudinally movable manner to one of either the transmission output shaft (3) and the transmission input shaft (2), and which is actively connectable with a second cam element (29) solidly fixed, respectively, to the one of the transmission input shaft (2) and the transmission output shaft (3) in such a manner that when a rotation speed difference exists between the first and the second cam elements (23, 29) and when the first and the second cam elements (23, 29) are actively connected, the piston element (22) moves back and forth within the pump housing component (20).

18. The transmission device according to claim 17, wherein the second cam element (29) is connected to the one of the transmission input shaft (2) and the transmission output shaft (3) by at least two cam pins (30, 31), and the cam pins (30, 31) are different from one another.

19. The transmission device according to claim 18, wherein a compression zone (33) of the auxiliary pump device (5) is connected to a lubrication pressure duct (36) of the transmission input shaft (2) via a through-bore (38) of a cam pin (30) of the second cam element (29).

20. The transmission device according to claim 17, wherein the active connection between the first and the second cam elements (23, 29) is released by an actuating pressure of a shift element in opposition to a spring force acting on the piston element (22).

* * * * *